(12) United States Patent
Becker et al.

(10) Patent No.: US 10,443,655 B2
(45) Date of Patent: Oct. 15, 2019

(54) COMBINATION BEARING AND SEAL ASSEMBLY WITH COMMON OUTER BODY

(71) Applicants: Aktiebolaget SKF, Göteborg (SE); Kaydon Ring & Seal, Inc., Baltimore, MD (US)

(72) Inventors: Jeffrey Becker, Jamestown, NY (US); George Haynes, Middle River, MD (US); Craig Krull, Erie, PA (US); Marco Mourglia, Villar Perosa (IT)

(73) Assignees: Kaydon Ring & Seal, Inc., Baltimore, MD (US); Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/700,626

(22) Filed: Sep. 11, 2017

(65) Prior Publication Data
US 2019/0078621 A1 Mar. 14, 2019

(51) Int. Cl.
| | |
|---|---|
| F16C 33/78 | (2006.01) |
| F16C 19/06 | (2006.01) |
| F16J 1/00 | (2006.01) |
| F16C 35/067 | (2006.01) |
| F16C 19/26 | (2006.01) |

(52) U.S. Cl.
CPC .......... F16C 33/782 (2013.01); F16C 19/06 (2013.01); F16C 33/7856 (2013.01); F16C 33/7886 (2013.01); F16J 1/00 (2013.01); F16C 19/26 (2013.01); F16C 35/067 (2013.01)

(58) Field of Classification Search
CPC .... F16C 33/766; F16C 33/767; F16C 33/586; F16C 33/582; F16C 33/5826

USPC .................................................. 384/481, 475
See application file for complete search history.

(56) References Cited

U.S. PATENT DOCUMENTS

| | | | | |
|---|---|---|---|---|
| 3,218,110 A | * | 11/1965 | Conner | F16C 33/78 |
| | | | | 277/353 |
| 3,647,227 A | * | 3/1972 | Lojkutz | F16J 15/38 |
| | | | | 277/373 |
| 4,406,460 A | | 9/1983 | Slayton | |
| 5,160,149 A | * | 11/1992 | Winn | F16J 15/3468 |
| | | | | 277/362 |

(Continued)

FOREIGN PATENT DOCUMENTS

| | | |
|---|---|---|
| FR | 268958 A1 | 10/1993 |
| GB | 1238199 A | 7/1971 |

*Primary Examiner* — Thomas R Hannon
(74) *Attorney, Agent, or Firm* — Mark Ussai; SKF USA Inc. Patent Dept.

(57) ABSTRACT

A combination bearing and seal assembly includes a tubular outer body connectable with an outer member and having first and second axial ends, opposing inner and outer surfaces and a bearing outer raceway on the outer body inner surface. A tubular inner body is disposed within an outer body bore and is disposeable about and coupleable with the rotatable member. The inner body has inner and outer surfaces, opposing outer and inner axial ends, the inner axial end providing a generally radial seal contact surface, and a bearing inner raceway on the inner body outer surface. Rolling elements disposed between the outer and inner raceways rotatably couple the outer and inner bodies and form a bearing. An annular seal is within the outer body bore, is coupled with the tubular outer body and has a generally radial sealing surface sealingly engageable with the inner body contact surface.

16 Claims, 15 Drawing Sheets

(56) References Cited

U.S. PATENT DOCUMENTS

| | | | | |
|---|---|---|---|---|
| 5,183,342 | A * | 2/1993 | Daiber | F01D 25/18 384/462 |
| 5,344,087 | A * | 9/1994 | Froeschke | B01J 2/20 241/15 |
| 5,458,421 | A * | 10/1995 | Giese | F16C 19/46 384/467 |
| 5,649,771 | A * | 7/1997 | Chancellor | F16C 19/55 384/481 |
| 5,722,665 | A * | 3/1998 | Sedy | F16J 15/3412 277/400 |
| 6,305,693 | B1 | 10/2001 | Wehrle | |
| 8,091,898 | B2 * | 1/2012 | Garrison | F01D 25/183 277/399 |
| 8,616,777 | B1 * | 12/2013 | Smith | F16C 33/6677 384/475 |
| 9,033,581 | B2 * | 5/2015 | Carter | F16C 33/6677 384/475 |
| 9,062,775 | B2 * | 6/2015 | Short | F16J 15/3448 |
| 9,291,067 | B2 * | 3/2016 | Zheng | F01D 11/003 |
| 9,714,712 | B2 * | 7/2017 | Kiernan | F16J 15/3412 |
| 2007/0296156 | A1 | 12/2007 | Yanagisawa et al. | |
| 2010/0201074 | A1 | 8/2010 | Haynes et al. | |
| 2011/0006485 | A1 | 1/2011 | Nakagawa | |
| 2013/0223782 | A1 * | 8/2013 | Mandou | F16J 15/3464 384/481 |
| 2013/0285331 | A1 | 10/2013 | Kostka et al. | |

\* cited by examiner

COMBINATION BEARING AND SEAL ASSEMBLY WITH COMMON OUTER BODY

BACKGROUND OF THE INVENTION

The present invention relates to bearings and seals, and more particularly to bearings and seals used in high speed and/or high temperature applications.

Bearings and seals are each generally known in numerous different types and configurations, such as plain bearings, rolling element bearings, elastomeric lip seals, carbon ring seals, etc. When used in relatively high speed or/and relatively high temperature applications, the bearings are typically rolling element bearings and the seals are often radial face sealing carbon ring seals in order to function effectively in such ambient conditions. Typically, a separate ring seal assembly is located adjacent to a bearing assembly to prevent or at least reduce the flow of certain fluids (e.g., steam, combustion products, etc.) into the bearing.

SUMMARY OF THE INVENTION

In one aspect, the present invention is a combination bearing and seal assembly for coupling a rotatable inner member with an outer member, the inner member being rotatable about a central axis. The bearing and seal assembly comprises a generally tubular outer body connectable with the outer member and disposeable about the rotatable inner member. The outer body has a central axis, first and second axial ends, opposing inner and outer circumferential surfaces, the outer body inner surface defines a bore, and a bearing outer raceway on the outer body inner surface. A generally tubular inner body is disposed within the outer body bore so as to be generally coaxial with the outer body, the inner body being disposeable about and coupleable with the rotatable member. The inner body has inner and outer circumferential surfaces and opposing outer and inner axial ends, the inner axial end providing a generally radial seal contact surface. The inner body further has a bearing inner raceway on the inner body outer surface, the inner raceway being generally axially aligned with the outer raceway. A plurality of rolling elements are disposed between the outer and inner raceways so as to rotatably couple the outer and inner bodies and form a bearing. Further, a generally annular seal is disposed within the outer body bore generally axially between the outer body second axial end and the inner body inner axial end, is coupled with the tubular outer body and is disposeable about the rotatable inner member. The seal has a generally radial sealing surface configured to sealingly engage with the inner body radial contact surface so as to generally prevent fluid flow between the outer body second axial end and the bearing.

In another aspect, the present invention is again a combination bearing and seal assembly for coupling a rotatable inner member with an outer member, the inner member being rotatable about a central axis. The combination bearing and seal assembly comprises a generally tubular outer body connectable with the outer member and disposeable about the rotatable member. The outer body has opposing inner and outer circumferential surfaces, the outer body inner surface defining a bore and having a section providing a bearing outer raceway. A generally tubular inner body is disposeable within the outer body bore and about the rotatable inner member, the inner body being coupleable with the inner member so as to be rotatable about the central axis. The inner body has inner and outer circumferential surfaces, opposing outer and inner axial ends, the inner body inner radial end providing a generally radial seal contact surface. A section of the inner body outer circumferential surface is generally axially aligned with the bearing outer raceway and provides a bearing inner raceway. A plurality of rolling elements are disposed between the outer and inner raceways so as to rotatably couple the outer and inner bodies and form a bearing. Further, a generally annular seal is movably coupled with the outer body, is disposed within the outer body bore so as to be spaced axially from the inner body and is disposeable about the rotatable inner member. The seal has a generally radial seal surface configured to sealingly engage with the inner body radial contact surface and an inner circumferential surface spaced radially outwardly from the rotatable inner member when the seal is disposed about the rotatable member.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
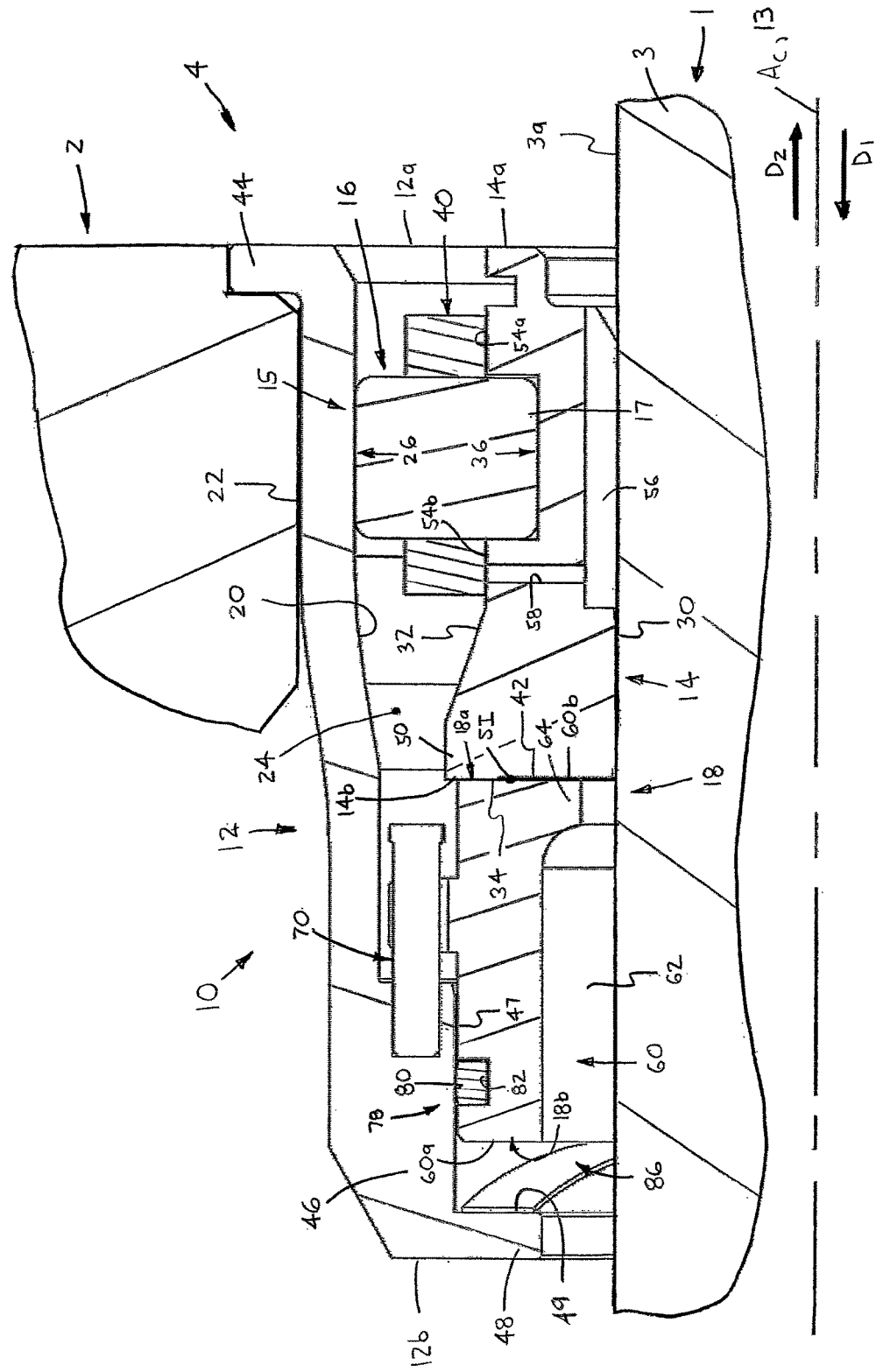
FIG. 1 is an enlarged, broken-away axial cross-sectional view of a combination bearing and seal assembly in accordance with the present invention, shown connected with inner and outer members of a machine.
Figure 2:
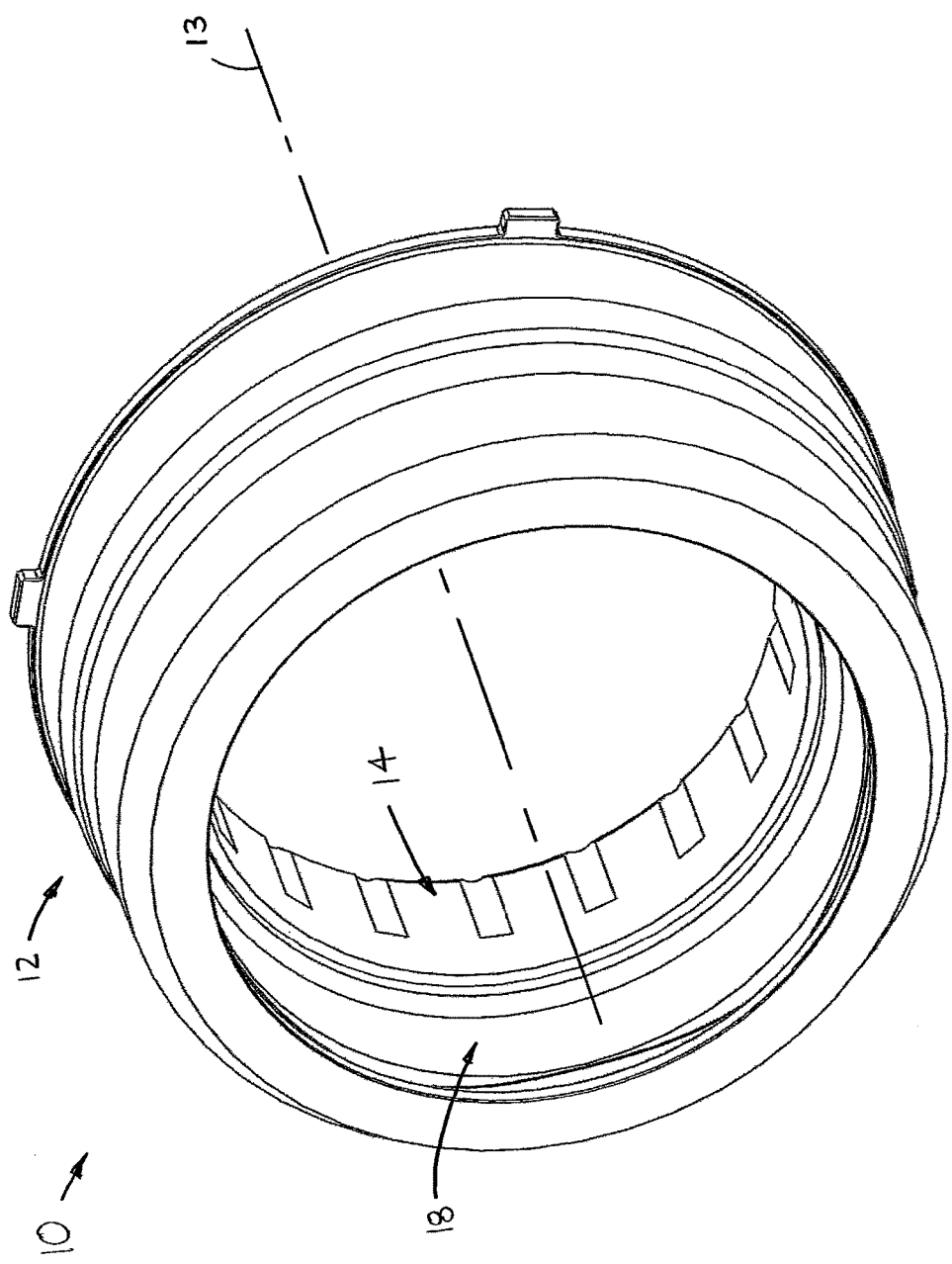
FIG. 2 is a perspective view of the combination bearing and seal assembly.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-16 a combination bearing and seal assembly 10 for coupling a rotatable inner member 1 (e.g., a shaft) with an outer member 2, such as a housing, a frame, etc., the inner member 1 being rotatable about a central axis $A_C$. The rotatable member 1 is preferably a shaft 3 (or a sleeve/runner on the shaft 3), most preferably a high speed engine shaft disposed within a frame or housing 2 of a machine 4, such as for example, a gas turbine, a steam turbine, a compressor or similar devices. Further, the shaft 3 and the bearing and seal assembly 10 are each preferably configured to operate in a relatively high temperature environment, for example, ambient conditions greater than one hundred degrees Celsius (100° C.). The bearing and seal assembly 10 basically comprises a generally tubular outer body 12 connectable with the outer member 2 and disposeable about the rotatable inner member 1, a generally tubular inner body 14 disposed within the outer body 12 and disposeable about the rotatable member 1, a plurality of rolling elements 16 disposed between the inner and outer bodies 12, 14 and an "axial face" seal 18 disposed within the outer body 12 and disposeable about the rotatable member 1.

Figure 14:
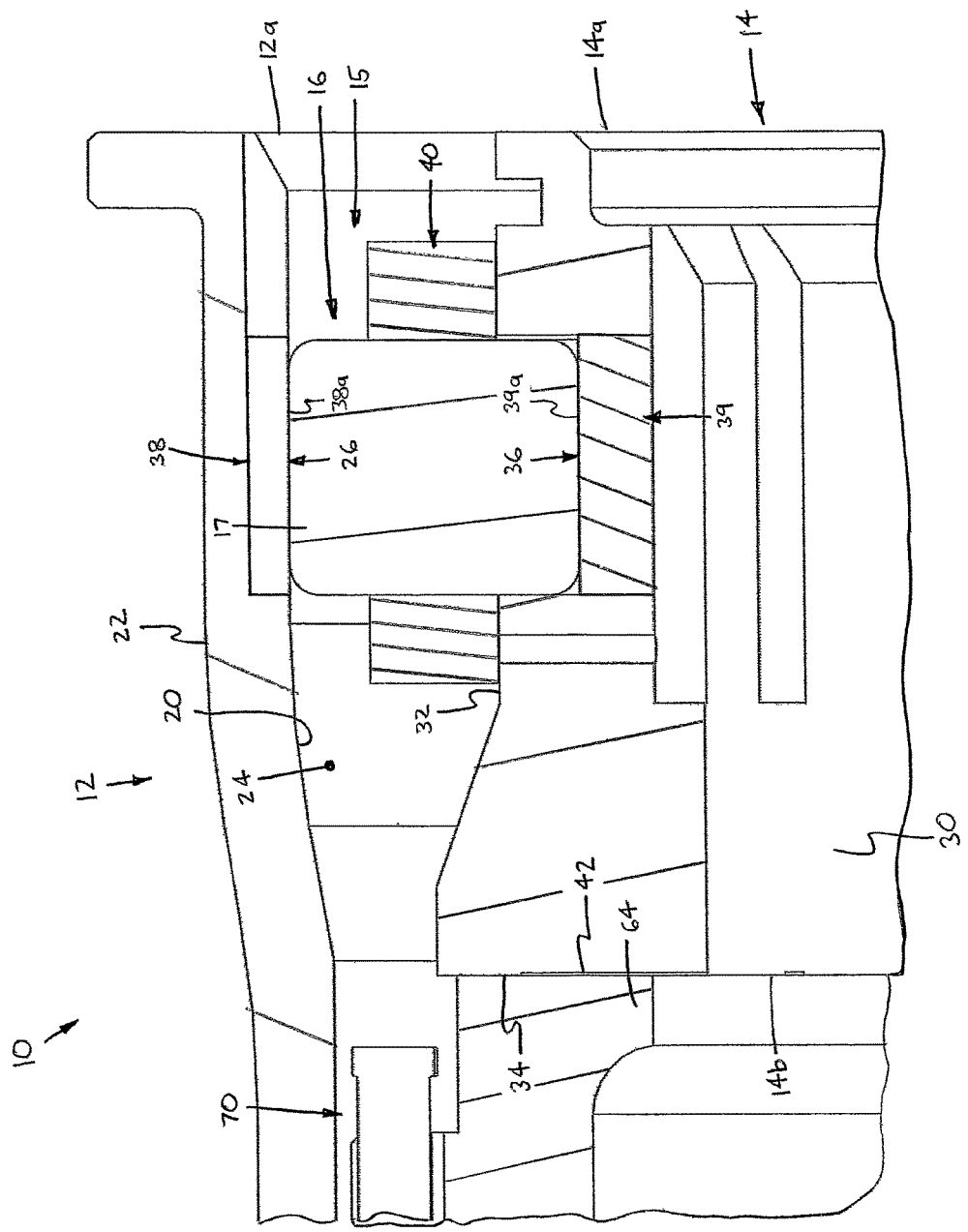
FIG. 14 is another more enlarged view of a portion of FIG. 6, showing details of the bearings with alternative bearing race components.

More specifically, the tubular outer body 12 has a central axis 13, first and second axial ends 12a, 12b, respectively, and opposing inner and outer circumferential surfaces 20, 22, respectively, the inner surface 20 defining a bore 24. The outer body 12 further has a bearing outer raceway 26 on the outer body inner surface 20, which is preferably provided by a section of the outer body inner surface 20. Alternatively, the outer raceway 26 may be provided by an inner circumferential surface 38a of an annular body 38 disposed within the bore 24, as shown in FIG. 14. Further, the tubular outer body 12 is configured to fixedly connect with the outer member 2 so as to be non-rotatable with respect to the shaft central axis $A_C$. The outer body axis 13 is at least substantially collinear with the shaft axis $A_C$ when the outer body 12 is disposed about the inner member/shaft 3.

The tubular inner body 14 is disposed within the outer body bore 24 so as to be generally coaxial with the outer body 12 (i.e., centered about the axis 13) and is coupleable with the rotatable inner member 1 so as to be rotatable about the central axis $A_C$. (i.e., during rotation of the shaft 3). The inner body 14 has inner and outer circumferential surfaces 30, 32, respectively, and opposing outer and inner axial ends 14a, 14b, respectively. The outer axial end 14a is generally axially adjacent to the outer body first axial end 12a and the inner radial end 14b provides a generally radial seal contact surface 34. The inner surface 30 of the tubular inner body 14 is preferably sized to frictionally engage with the outer circumferential surface 3a of the shaft 3 (or the outer surface of a sleeve/runner (not shown)), so as to both rotatably couple the tubular inner body 14 with the inner member 1 and seal the interface (not indicated) between the inner body 14 and the member/shaft 3. Also, the tubular inner body 14 has a bearing inner raceway 36 on the inner body outer surface 32, the inner raceway 36 being located so as to be generally axially aligned (i.e., aligned along the axis 13) with the outer raceway 26. Preferably, the inner raceway 36 is provided by a section of the inner body outer circumferential surface 32, but may alternatively be provided by an outer circumferential surface 39a of an annular body 39 disposed about the inner body 14 (FIG. 14).

Further, the plurality of rolling elements 16 are disposed between the inner and outer raceways 26, 36 so as to rotatably couple the outer and inner bodies 12, 14 and form a bearing 15. Each rolling element 16 is preferably a cylindrical roller 17, but may alternatively be formed as a ball, a needle, a tapered roller, or any other type of rolling element (no alternatives shown). Preferably, the bearing and seal assembly 10 further comprises a bearing cage 40 configured to retain the rolling elements 16 as described below, but may alternatively be formed without a cage or other retaining device.

Furthermore, the seal 18 is disposed within the outer body bore 24 so as to be located generally axially between the outer body second axial end 12b and the inner body inner axial end 14b. The seal 18 has opposing inner and outer axial ends 18a, 18b and is coupled with the tubular outer body 12 so as to be substantially non-rotatable about the axis $A_C$. Further, the seal 18 has a generally radial sealing surface 42 on the inner axial end 18a, the sealing surface 42 being configured to sealingly engage with the inner body contact surface 34 so as to at least generally prevent fluid flow between the outer body second axial end 12b and the bearing 15, specifically through an interface SI between the seal 18 and the body 14. Having described the basic elements above, these and other components of the combination bearing and seal assembly 10 are described in further detail below.

Referring to FIGS. 1-9 and 14-16, the tubular outer body 12 is generally circular, but preferably tapers generally radially-inwardly in an axial direction $D_1$ (FIG. 1) from the first axial end 12a to the second axial end 12b. The outer tubular body 12 is preferably formed as one-piece construction or as singular integral body, but may alternatively formed of a plurality of connected tubular body sections (not depicted). Preferably, a plurality of lugs 44 are located adjacent to the body first axial end 12a and extend radially outwardly from the outer surface 22 and are spaced circumferentially about the central axis 13. The lugs 44 are engageable with the outer member 2 to fixedly connect the bearing and seal assembly 10 therewith, as depicted in FIG. 1, although the outer body 12 may alternatively be provided with a radial flange or any other appropriate structure to enable connection with the second member 2.

Figure 15:
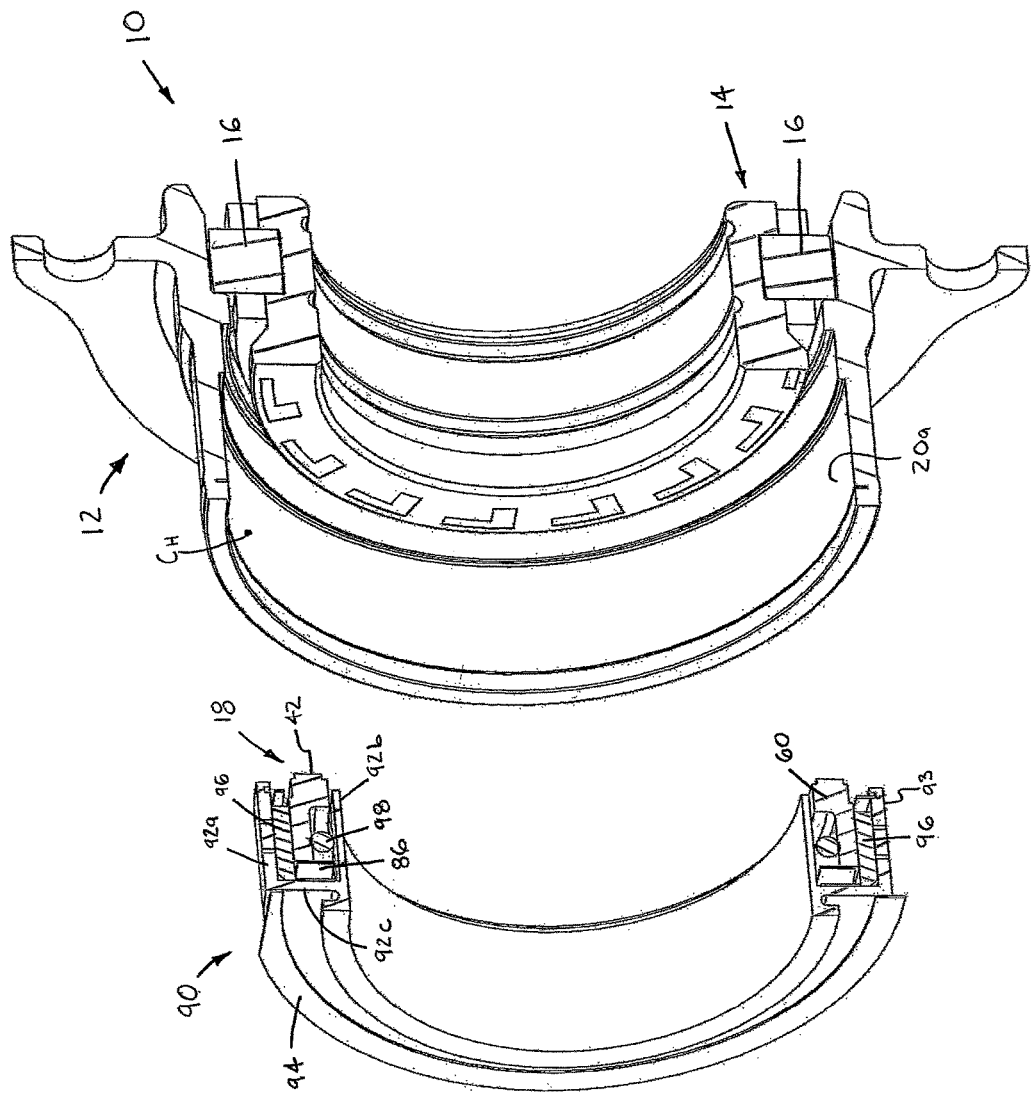
FIG. 15 is an axial cross-sectional view in perspective of an alternative construction of the seal of the combination bearing and seal assembly, shown with a cartridge seal assembly separate from the outer tubular body.
Figure 16:
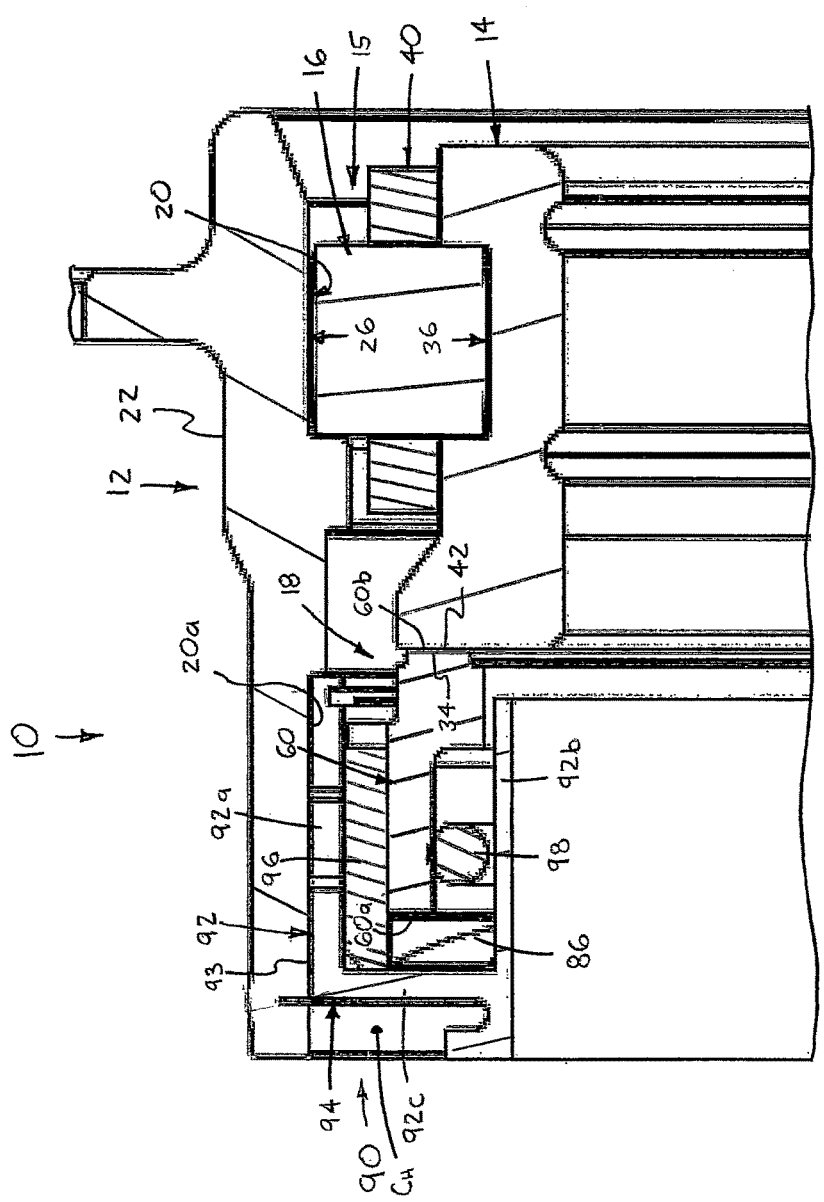
FIG. 16 is an enlarged, broken-away axial cross-sectional view of the combination bearing and seal assembly with the alternative cartridge seal construction.

Further, the outer body 12 preferably has an annular shoulder section 46 extending radially inwardly from a remainder of the body inner surface 20 and located adjacent to the second axial end 12b. The shoulder 46 has an inner circumferential surface 47 engageable by the seal 18, preferably by a secondary seal 78 disposed about the seal 18 as described below. Alternatively, the outer body 12 may be formed without any shoulder and instead a section 20a of the inner surface 20 is engageable by a cartridge seal 90, as shown in FIGS. 15 and 16 and described below. With the preferred shoulder 46, the outer body 12 preferably further includes an annular retainer flange 48 extends radially inwardly from outer body second axial end 12b and provides a radial retention surface 49 for a biasing member 86, as discussed in detail below.

Figure 5:
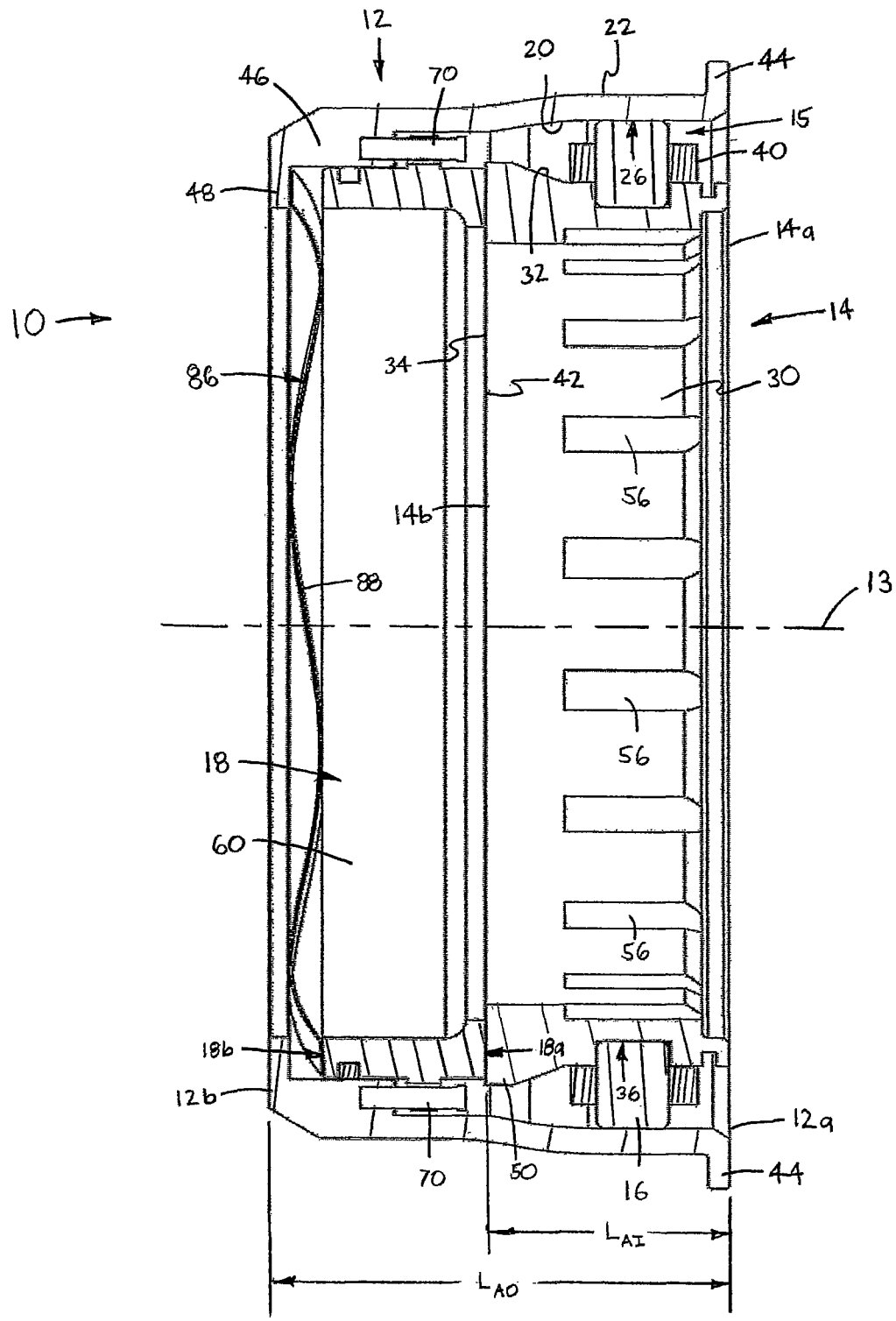
FIG. 5 is an axial cross-sectional view of the combination bearing and seal assembly.
Figure 6:
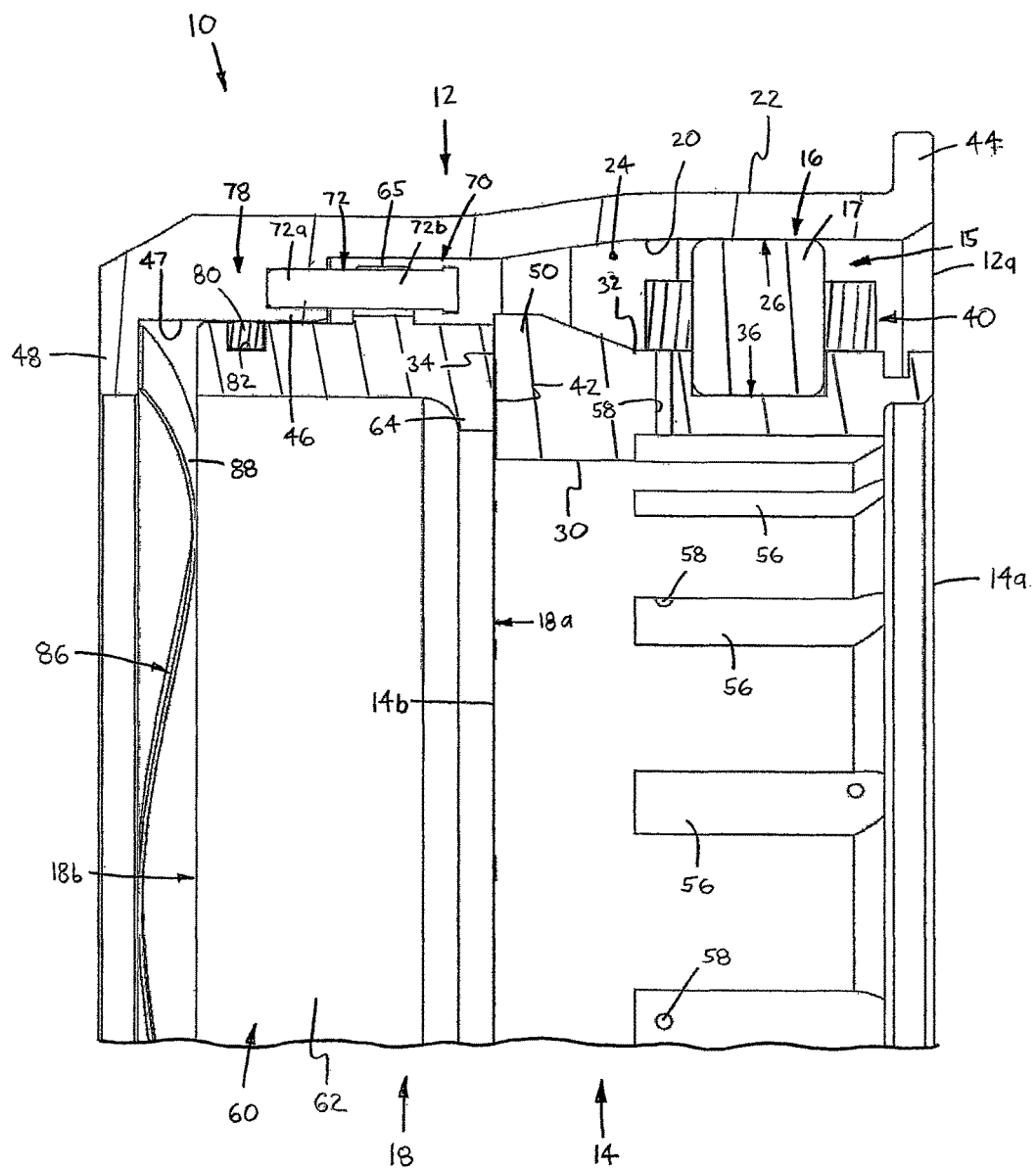
FIG. 6 is an enlarged, broken-away axial cross-sectional view of the combination bearing and seal assembly.
Figure 7:
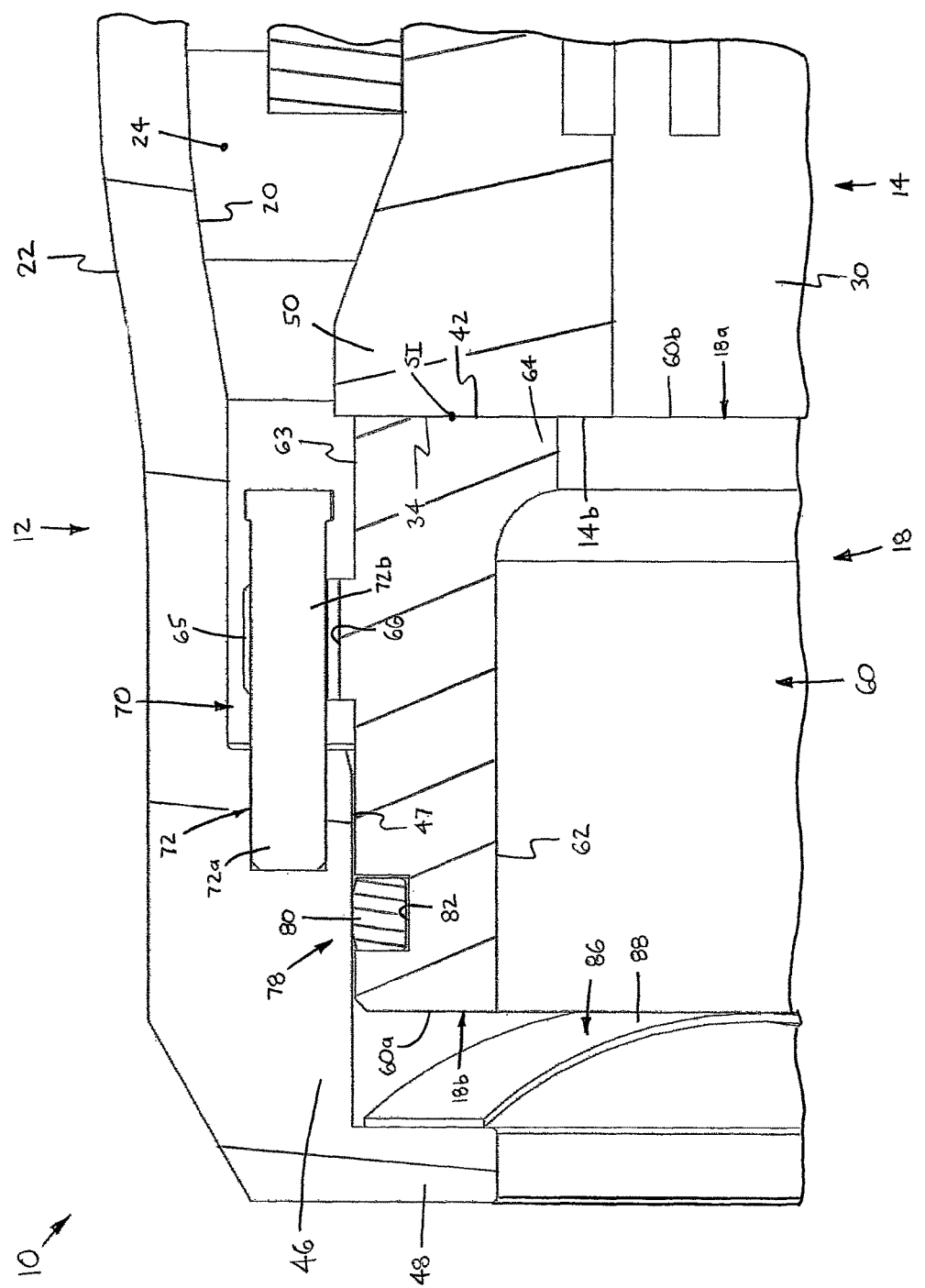
FIG. 7 is a more enlarged view of a portion of FIG. 6, showing details of a seal.

Referring now to FIGS. 1-11 and 14-16, the tubular inner body 14 is also preferably generally circular and has an axial length $L_{AI}$ about half of the axial length $L_{AO}$ of the outer body 12, as indicated in FIG. 5. As with the outer body 12, the tubular inner body 14 is also preferably formed as a one-piece or singular, integral body but may instead be formed of a plurality of connected tubular body sections. The inner body 14 has a radially-outwardly extending shoulder 50 adjacent to the body inner axial end 14b so as to increase the radial width of the axial end 14b, and thereby increase the surface area of the seal contact surface 34. Preferably, a plurality of grooves 52 extend axially-inwardly from the seal contact surface 34 and are each configured to generate an axial biasing force on the seal 18 when the rotatable member 1 rotates about the central axis $A_C$ such that the sealing surface 42 is spaced axially apart from the inner body contact surface 34.

More specifically, fluid entering the grooves 52 when the tubular inner body 14 rotates about the central axis $A_C$ (i.e., with the rotatable member 1) becomes pressurized and is directed against the sealing surface 42, causing the seal 18 to displace axially away from the contact surface 34, thereby reducing (and preferably temporarily eliminating) friction between the seal 18 and tubular inner body 14. Preferably, in order to further reduce friction, particularly in the transition between static and dynamic conditions, a wear resistant coating may be disposed on the contact surface 34 of the inner tubular body 14.

Preferably, the inner raceway 36 is spaced radially-inwardly from a remainder of the outer circumferential surface 32 of the inner tubular body 14. As such, two support surfaces 54a, 54b are defined each adjacent to a separate axial end 36a, 36b, respectively, of the inner raceway 36, which support the bearing cage 40 as described in further detail below. Further, the inner body 14 also preferably has a plurality of axial slots 56 extending from the inner body outer axial end 14a and radially outwardly from the body inner surface 30. At least one and preferably a plurality of radial lubrication passages 58 each extend generally radially between the body inner circumferential surface 30, preferably from a separate one of the axial slots 56, and one of the two support surface sections 54a, 54b. As such, lubricant entering the axial slots 56 is directed radially outwardly though the radial passages 58 by centrifugal force, thereafter entering the space between the support surfaces 54a, 54b and the cage 40 to lubricate the cage 40 as it slidably displaces upon the support surfaces 54a, 54b and the rolling elements 16.

Figure 3:
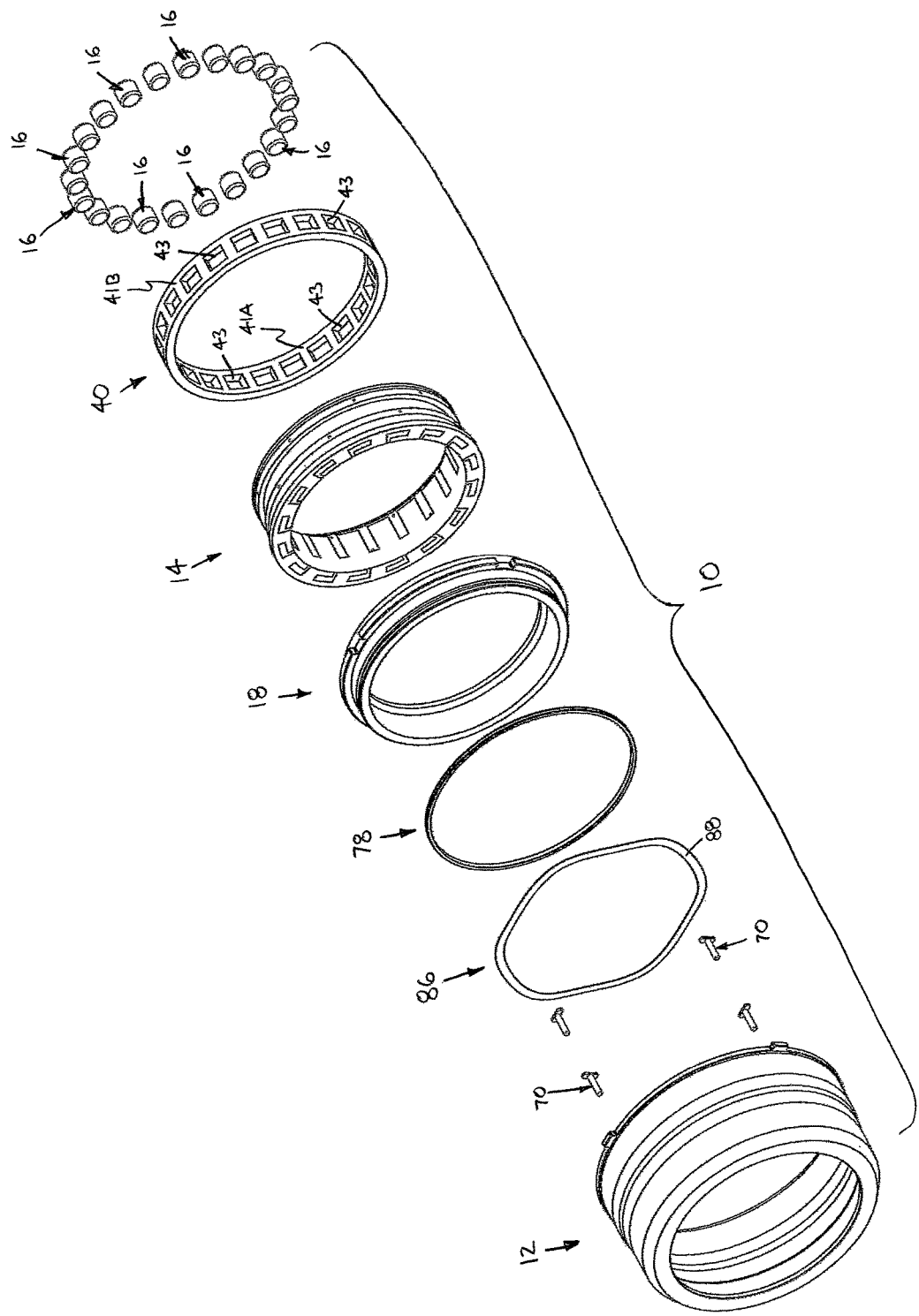
FIG. 3 is an exploded view of the combination bearing and seal assembly.
Figure 4:
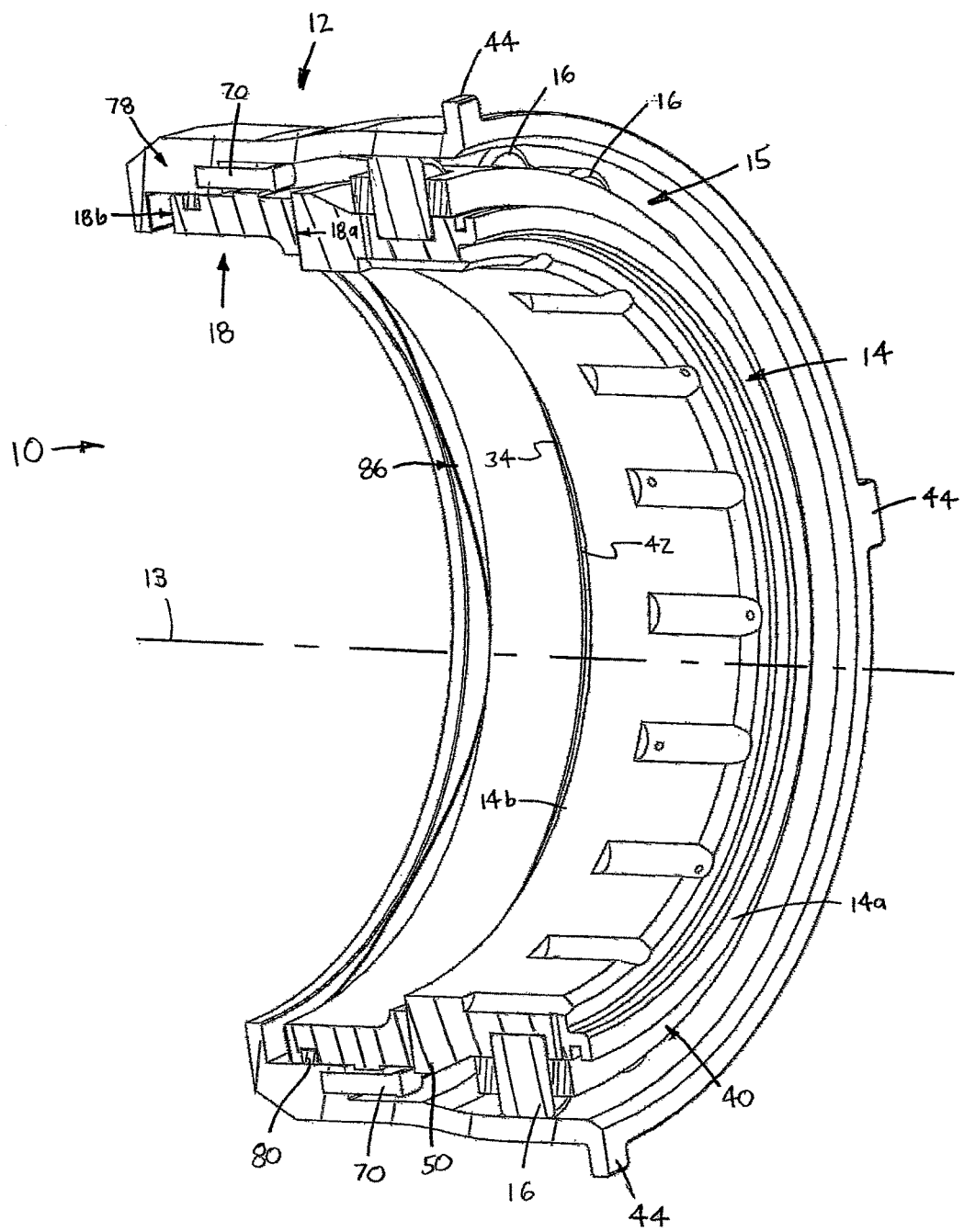
FIG. 4 is an axial cross-sectional view in perspective of the combination bearing and seal assembly.
Figure 8:
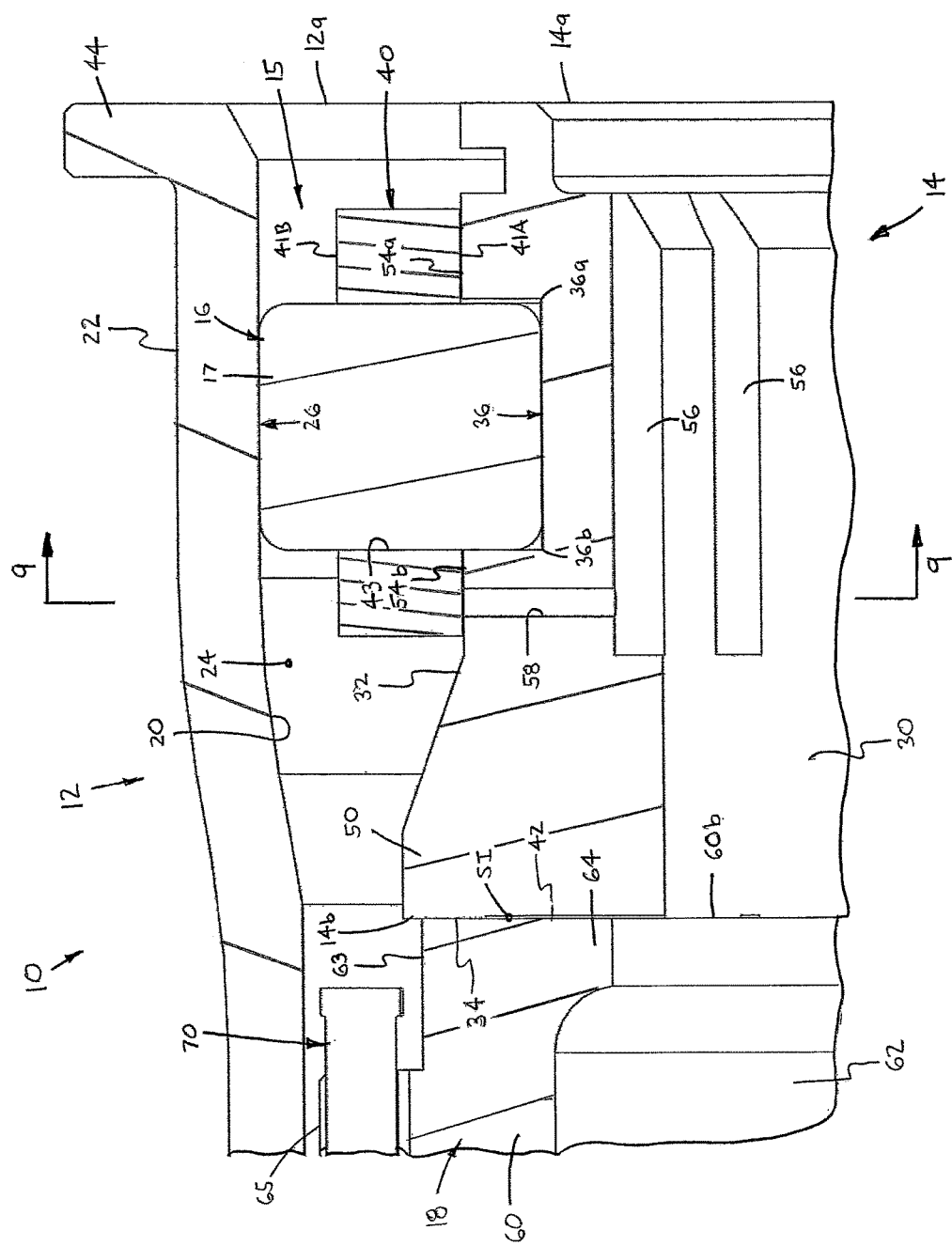
FIG. 8 is a more enlarged view of a portion of FIG. 6, showing details of a bearing.
Figure 9:
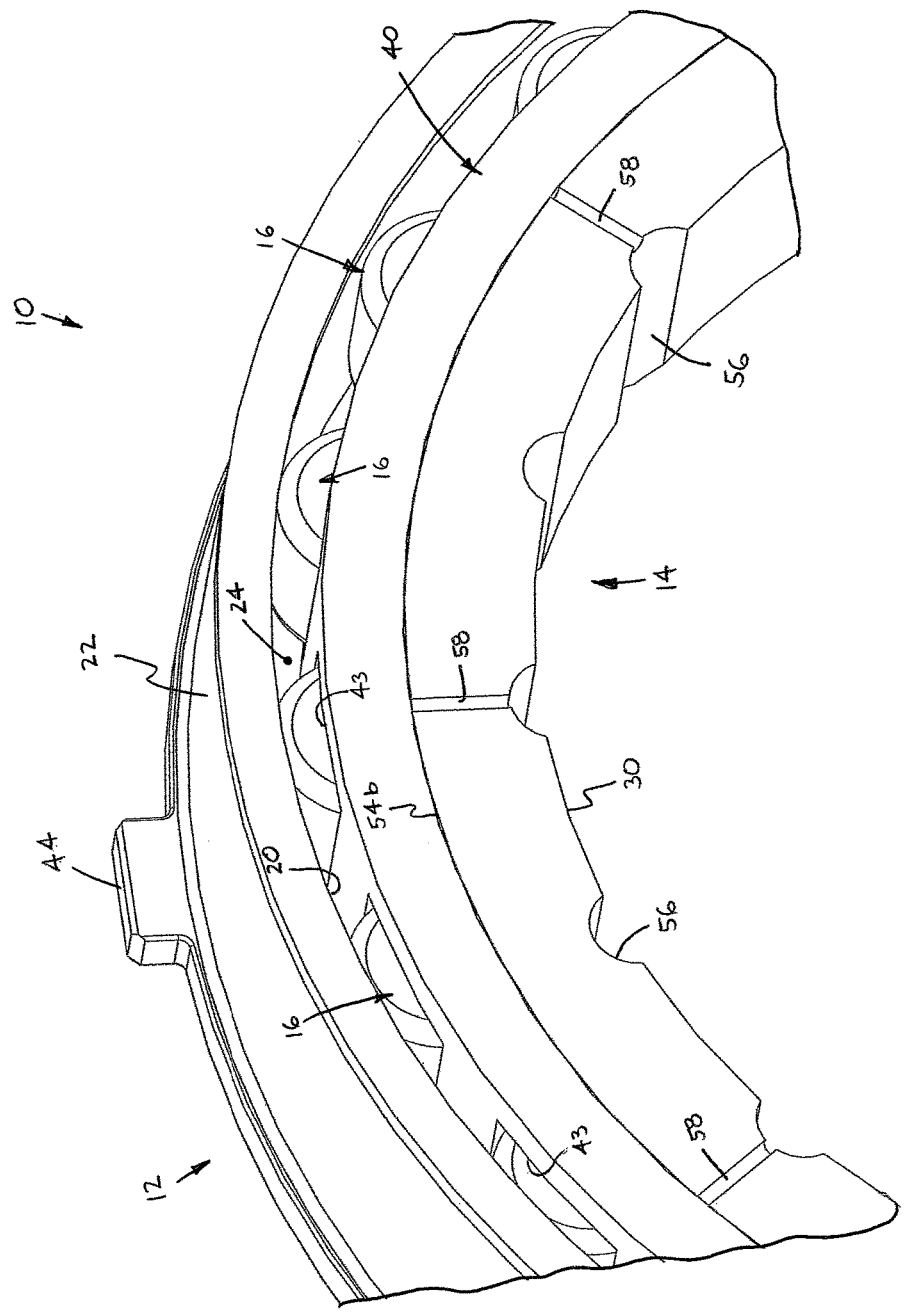
FIG. 9 is a broken-away perspective view through line 9-9 of FIG. 8.
Figure 10:
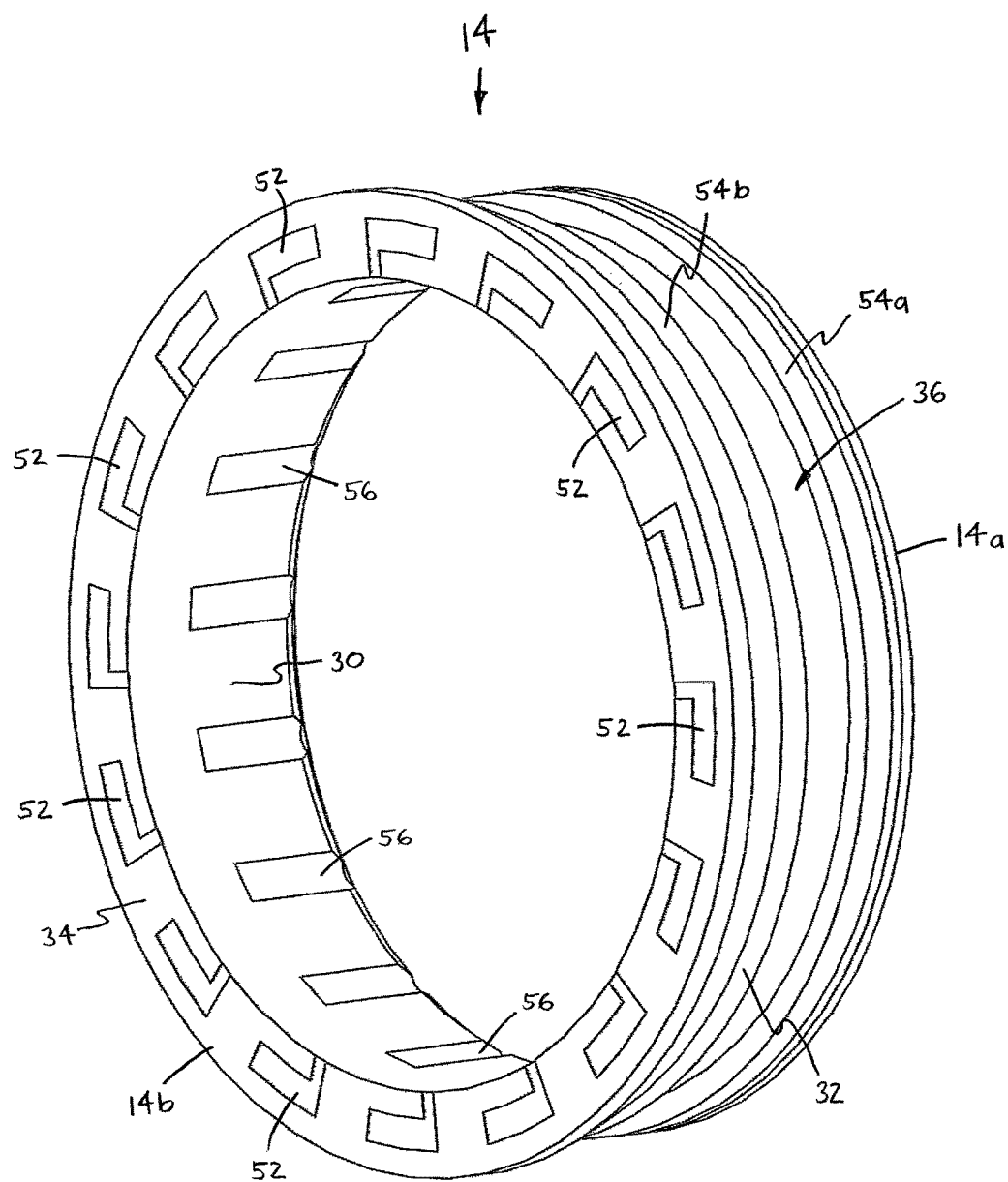
FIG. 10 is a perspective view of a tubular inner body of the combination bearing and seal assembly.
Figure 11:
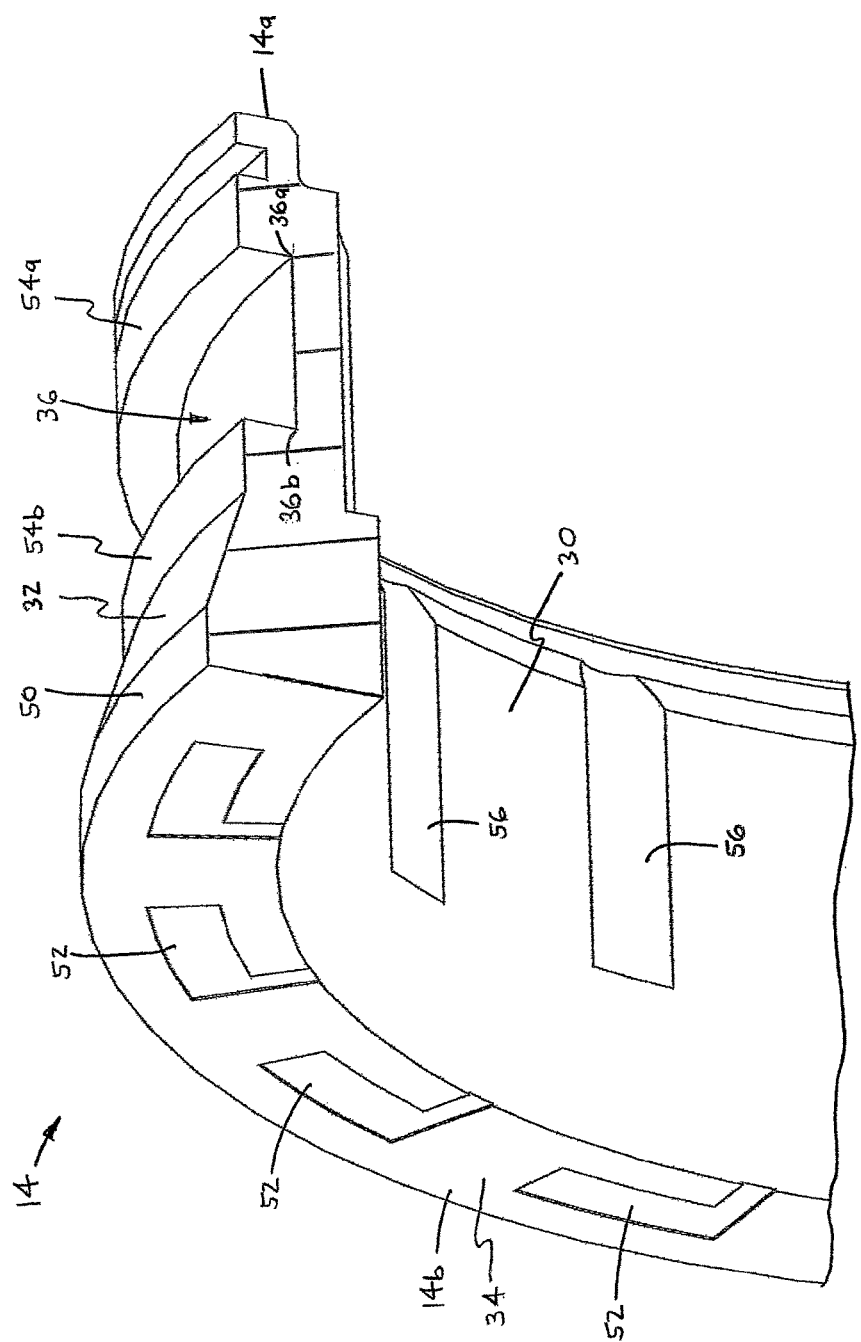
FIG. 11 is an enlarged, broken-away axial cross-sectional view in perspective of the tubular inner body.
Figure 13:
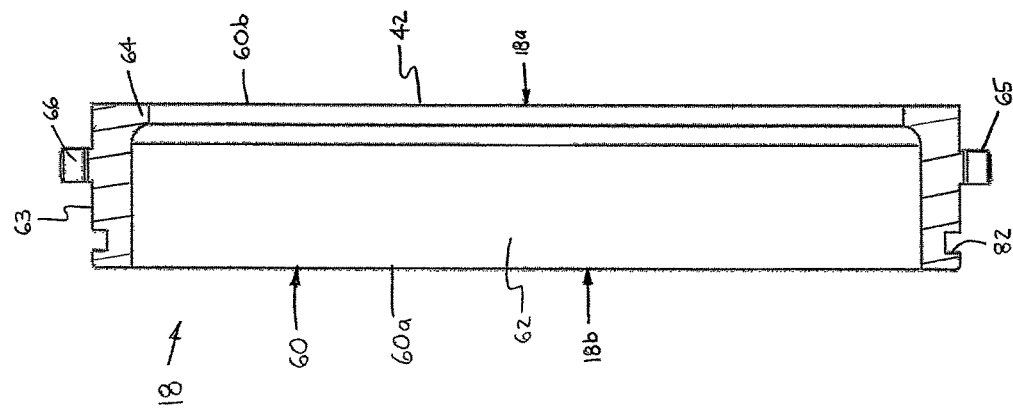
FIG. 13 is an axial cross-sectional view of the seal of the combination bearing and seal assembly.
Figure 12:
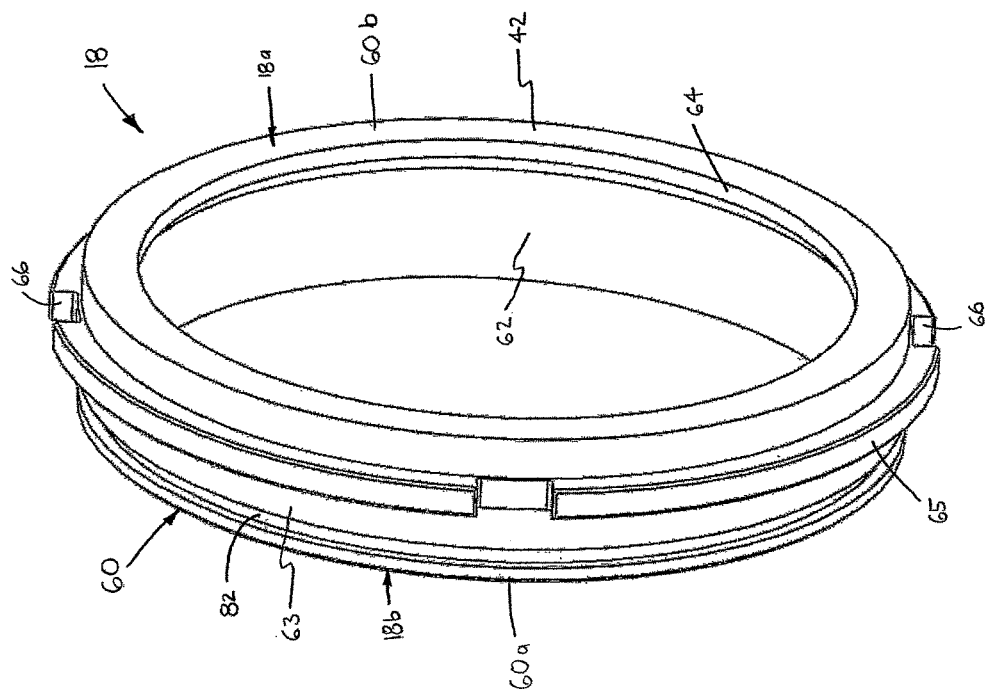
FIG. 12 is a perspective view of a seal of the combination bearing and seal assembly.

Referring to FIGS. 3, 8 and 9, the bearing cage 40 is disposed generally between the outer and inner tubular members 12, 14 and configured to "loosely" retain the plurality of rolling elements 16. The cage 40 includes inner and outer circumferential surfaces 41A, 41B and a plurality of radially-extending openings 43 between the surfaces 41A, 41B, each of which is preferably formed as a generally rectangular pocket, as best shown in FIG. 3. A separate one of the plurality of rolling elements 16 is disposed within each one of the cage openings/pockets 43, such that the cage 40 angularly displaces about the central axis $A_C$ as each rolling element 16 rolls simultaneously upon the raceways 26, 36 and rotates within the associated pocket 43. Further, as mentioned above, the bearing cage 40 is disposed about the two inner body support surface sections 54a, 54b, such that the cage inner surface 41A slides along the surfaces 54a, 54b as the cage 40 angularly displaces about the axis $A_C$.

Referring now to FIGS. 1-9 and 12-14, the seal 18 preferably includes a generally circular annular body 60 having opposing outer and inner axial ends 60a, 60b, the inner end 60b providing the sealing surface 42, and inner and outer circumferential surfaces 62, 63. The annular body 60 is preferably of one-piece construction, but may alternatively include a plurality of separate arcuate segments (not shown) connected together to form the body 60. The seal body 60 is sized such that the seal inner surface 62 is spaced radially outwardly from the rotatable member 1 when the seal 18 is disposed about the member/shaft 1, as depicted in FIG. 1, so as to eliminate any friction between the seal 18 and the rotatable member 1/shaft 3. Further, a shoulder 64 extends radially-inwardly from a remainder of the inner surface 62 adjacent to the seal body inner axial end 60b so as to increase the radial width of the inner end 60b, and thus the surface area of the sealing surface 42. Preferably, an annular flange 65 extends radially-outwardly from the body outer surface 63 and includes a plurality of axial slots 66 each configured to receive a coupler 70, as described below. The seal body 60 is preferably formed of a carbon material, but may alternatively be formed of a ceramic material, a high temperature polymer material, or any other appropriate material.

As best shown in FIGS. 1 and 3-7, the combination bearing and seal assembly 10 preferably further comprises at least one and preferably a plurality of couplers 70 each configured to movably couple the seal 18 with the tubular outer body 12. As such, the seal 18 is axially displaceable within the outer body bore 24 and non-rotatable with respect to the central axis $A_C$; i.e., the coupler(s) 70 prevent angular displacement of the seal 18 about the axis $A_C$. Each coupler 70 preferably includes an elongated pin 72 having a first end 72a disposed within the outer body shoulder section 46 and a second end 72b disposed within one of the seal flange axial slots 69. The coupler pins 72 interact with the seal flange 68 to substantially prevent angular displacement of the seal 18, but the slots 69 allow the seal 18 to slide axially along the pins 72. Although the coupler pins 70 are presently preferred, the combination bearing and seal assembly 10 may alternatively have any other structure or components to movably couple the seal 18 with the outer tubular body 12, one alternative shown in FIGS. 15 and 16 as described below.

Still referring to FIGS. 1 and 3-7, the bearing and seal assembly 10 preferably further includes a secondary seal 78 for preventing fluid flow between the seal 18 and the outer tubular body 12. The secondary seal 80 preferably includes an annular body 80 is disposed about the seal 18 and configured to seal generally between the seal 18 and the outer tubular body 12, to thereby prevent fluid flow between the seal outer surface 63 and tubular body inner surface 20.

Preferably, the seal body 60 has an annular groove 82 extending radially inwardly from the outer surface 63 and the secondary seal body 80 is an O-ring disposed within the groove 82 and configured to seal outwardly against the inner surface section 47 of the outer body shoulder 46. However, the secondary seal 78 may be constructed in any other appropriate way, such as for example, an integral portion (e.g., a flange) of the seal body 60 that seals directly against the shoulder inner surface 47.

Referring again to FIGS. 1 and 3-7, the bearing and seal assembly 10 also preferably further comprises at least one biasing member 86 configured to bias the seal 18 generally axially toward the inner body seal contact surface 34. More specifically, the biasing member 86 preferably includes a wave spring 88 and is disposed between the seal outer axial end 60*a* and the outer body retainer flange 48. The wave spring 88 is partially compressed between the body end 60*a* and the retainer flange 48 so as to tend to "push" or axially displace the seal body 60 in an alternative direction $D_2$ (FIG. 1) toward the tubular inner body 14. Alternatively, the biasing member(s) 86 may include one or more coil compression springs or any other appropriate component(s) capable of axially biasing the seal 18.

In any case, the biasing member 86 functions to ensure that the seal body sealing surface 42 remains juxtaposed against the seal contact surface 34 in a static state of the assembly 10 and the machine 3, i.e., when the inner member 1/shaft 3 is non-rotational, in order to prevent fluid flow in the seal interface SI between the seal 18 and the inner tubular body 14. However, in a dynamic state with the rotatable member/shaft 1 and the coupled tubular inner body 14 rotating or angularly displacing about the central axis $A_C$, the grooves 52 in the inner body contact surface 34 pressurize and direct fluid in the interface SI to displace the seal body 60 away from the tubular body 14 in order to reduce friction. Although some fluid passes through the seal interface SI during dynamic conditions, the substantial reduction in friction significantly increases seal life, which is considered more important than a complete prevention or interruption of fluid flow through the interface SI.

Referring now to FIGS. 15 and 16, the seal 18 may alternatively be provided by a cartridge seal assembly 90 further including an outer seal housing 92 having an inner chamber $C_H$ at least partially containing the seal 18 and an outer circumferential surface 93. The seal housing outer surface 93 is preferably frictionally engageable with a portion of the outer body inner surface 20 to retain the cartridge seal assembly 90 within the tubular outer body 12, although a C-clip 94 is also preferably provided to engage with the outer body 12 and the housing 92 to axially retain the cartridge seal 19. Further, the housing 92 is preferably generally C-shaped and has an outer annular portion 92*a* providing the outer surface 93, and inner annular portion 92*b* and a radial portion 92*c* connecting the outer and inner portions 92*a*, 92*b*.

Preferably, at least one and preferably two fixed anti-rotation lugs 96 are each rigidly attached to the inner surface of the housing outer annular portion 92*a* and engage with mating slots (not indicated) in the seal body 60 to prevent angular displacement of the seal 18. Further, an inner secondary seal 98, preferably an O-ring, is disposed between the seal body 60 and the housing inner annular portion 92*b*. The biasing member 86 is preferably disposed within the housing 92 and is compressed between the housing annular portion 92*c* and the seal body outer end 60*b*. As such, the biasing member 86 biases the seal body 60 toward the tubular inner body 14, such that the body 60 slides against the fixed anti-rotation lugs 96 and upon the inner secondary seal 98 and fluid flow past the housing 92 and the seal 18 is substantially prevented.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A combination bearing and seal assembly for coupling a rotatable inner member with an outer member, the inner member being rotatable about a central axis, the bearing and seal assembly comprising:

a generally tubular outer body connectable with the outer member, disposeable about the rotatable inner member and having a central axis, a first axial end, a second axial end, an inner circumferential surface and an outer circumferential surface, the outer body inner surface defining a bore, and a bearing outer raceway on the outer body inner surface;

a generally tubular inner body disposed within the outer body bore so as to be generally coaxial with the outer body, the inner body being disposeable about and coupleable with the rotatable member and having an inner circumferential surface, an outer circumferential surface, an outer axial end and an inner axial end, the inner axial end providing a generally radial seal contact surface, a radially-outwardly extending, integral shoulder adjacent the inner axial end of the inner body so as to increase the surface area of the seal contact surface, and a bearing inner raceway on the inner body outer surface, the inner raceway being generally axially aligned with the outer raceway;

a plurality of rolling elements disposed between the outer and inner raceways so as to rotatably couple the outer and inner bodies and form a bearing; and a generally annular seal disposed within the outer body bore generally axially between the outer body second axial end and the inner body inner axial end, coupled with the tubular outer body and disposeable about the rotatable inner member, the seal having a generally radial sealing surface configured to sealingly engage with the inner body contact surface so as to generally prevent fluid flow between the outer body second axial end and the bearing;

wherein the inner tubular body has a plurality of grooves extending axially-inwardly from the seal contact surface and configured to generate an axial biasing force on the seal when the rotatable member rotates about the central axis such that the sealing surface is spaced axially apart from the contact surface.

2. The combination bearing and seal assembly as recited in claim 1 wherein:

the outer raceway is provided by a section of the outer body inner surface or by an inner circumferential surface of an annular body disposed within the outer body; and the inner raceway is provided by a section of the inner body outer circumferential surface or by an outer circumferential surface of an annular body disposed about the inner body.

3. The combination bearing and seal assembly as recited in claim 1 wherein:

the outer circumferential surface of the inner tubular outer body has a surface section providing the inner raceway, the raceway surface section having two opposing axial ends, and two shoulder surface sections each spaced radially outwardly from a separate one of the raceway surface section axial ends; and the combination bearing and seal assembly further comprises a generally annular bearing cage slidably disposed about the two shoulder surface sections and including a plurality of radially-extending openings, a separate one of the plurality of rolling elements being disposed within each one of the cage openings.

4. The combination bearing and seal assembly as recited in claim 3 wherein the inner tubular body has at least one lubrication passage extending generally radially between the inner body inner circumferential surface and one of the two shoulder surfaces.

5. The combination bearing and seal assembly as recited in claim 1 wherein the tubular outer body is configured to fixedly connect with the outer member so as to be non-rotatable with respect to the central axis.

6. The combination bearing and seal assembly as recited in claim 1 further comprising at least one coupler configured to movably couple the seal with the outer body such that the seal is axially displaceable within the outer body bore and non-rotatable with respect to the central axis.

7. The combination bearing and seal assembly as recited in claim 1 further comprising a biasing member configured to bias the seal generally axially toward the inner body seal contact surface.

8. The combination bearing and seal assembly as recited in claim 7 wherein the biasing member includes a wave spring.

9. The combination bearing and seal assembly as recited in claim 1 wherein the seal has an inner circumferential surface, the seal being sized such that the seal inner circumferential surface is spaced radially outwardly from the rotatable member.

10. The combination bearing and seal assembly as recited in claim 1 wherein the seal includes a generally annular body.

11. The combination bearing and seal assembly as recited in claim 1 wherein the seal is formed of one of a carbon material, a ceramic material and a high temperature polymer material.

12. The combination bearing and seal assembly as recited in claim 1 further comprising a secondary seal including an annular body disposed about the seal and configured to seal generally between the seal and the outer tubular body.

13. The combination bearing and seal assembly as recited in claim 1 wherein the seal is provided by a cartridge seal further including an outer seal housing having an inner chamber at least partially containing the seal and an outer circumferential surface engageable with a portion of the outer body inner surface to retain the cartridge seal assembly within the tubular outer body.

14. The combination bearing and seal assembly as recited in claim 1 wherein a wear resistant coating is disposed on the contact surface of the inner tubular body.

15. The combination bearing and seal assembly as recited in claim 1 wherein each one of the inner and outer tubular bodies includes one of a single tubular body and a plurality of connected tubular body sections.

16. The combination bearing and seal assembly as recited in claim 1 further comprising a generally annular bearing cage disposed generally between the outer and inner tubular members and including a plurality of radially-extending openings, a separate one of the plurality of rolling elements being disposed within each one of the cage openings.

* * * * *